United States Patent [19]

Gebauer et al.

[11] Patent Number: 4,767,025
[45] Date of Patent: Aug. 30, 1988

[54] HAND TOOL FOR MIXING AND DISPENSING TWO-COMPONENT MASSES

[75] Inventors: Ludwig Gebauer, Olching; Peter Mauthe, Kleinberghofen, both of Fed. Rep. of Germany

[73] Assignee: Hilti Aktiengesellschaft

[21] Appl. No.: 936,174

[22] Filed: Dec. 1, 1986

[30] Foreign Application Priority Data

Dec. 2, 1985 [DE] Fed. Rep. of Germany ....... 3542522

[51] Int. Cl.$^4$ .................... B67D 5/52; B05C 17/00; B05C 11/10
[52] U.S. Cl. ................................ 222/135; 222/145; 401/176; 401/172; 401/44
[58] Field of Search ................ 401/176, 41, 42, 40, 401/68, 172, 44; 222/134, 135

[56] References Cited

U.S. PATENT DOCUMENTS

| | | | |
|---|---|---|---|
| 1,055,028 | 12/1911 | Flynn et al. | |
| 2,752,199 | 12/1954 | Newell, Jr. | |
| 3,097,764 | 7/1963 | Loeser | 222/134 X |
| 3,323,682 | 6/1967 | Creighton, Jr. et al. | 401/176 X |
| 3,854,630 | 12/1974 | Standridge | 222/135 |
| 3,894,722 | 7/1975 | Jones | 222/135 X |
| 3,993,219 | 11/1976 | Franzosi | 222/134 X |
| 4,121,738 | 10/1978 | Virag | 222/134 |
| 4,140,246 | 2/1979 | Frankie | 222/135 X |
| 4,273,260 | 6/1981 | Bush | 222/135 |
| 4,411,601 | 10/1983 | Hersom et al. | 222/135 X |

FOREIGN PATENT DOCUMENTS 2809228 9/1979 Fed. Rep. of Germany.

*Primary Examiner*—Richard J. Apley
*Assistant Examiner*—David J. Bender
*Attorney, Agent, or Firm*—Toren, McGeady & Associates

[57] ABSTRACT

In a hand tool for the mixing and metered dispensing of a two-component mass, a container holding a solid component mass is mounted in a handgun-like shaped support member. A mixing chamber is aligned with and mounted on one end of the container for mixing the components of the mass. A motor in the support member drives a drive shaft extending axially through the container. A mixing worm is connected to the drive shaft and is located within the mixing chamber. A metering pump is located within the support member for delivering a liquid component of the mass from a tank. The metering pump is a hose pump powered by the drive shaft. A conveying helix is positioned on the drive shaft in the container. Accordingly, since the drive shaft powers the metering pump and the conveying helix, a fixed mixture ratio of the solid and liquid components is delivered into the mixing chamber independently of the quantity dispensed. The mixed components flow out of the mixing chamber through a dispensing nozzle.

8 Claims, 1 Drawing Sheet

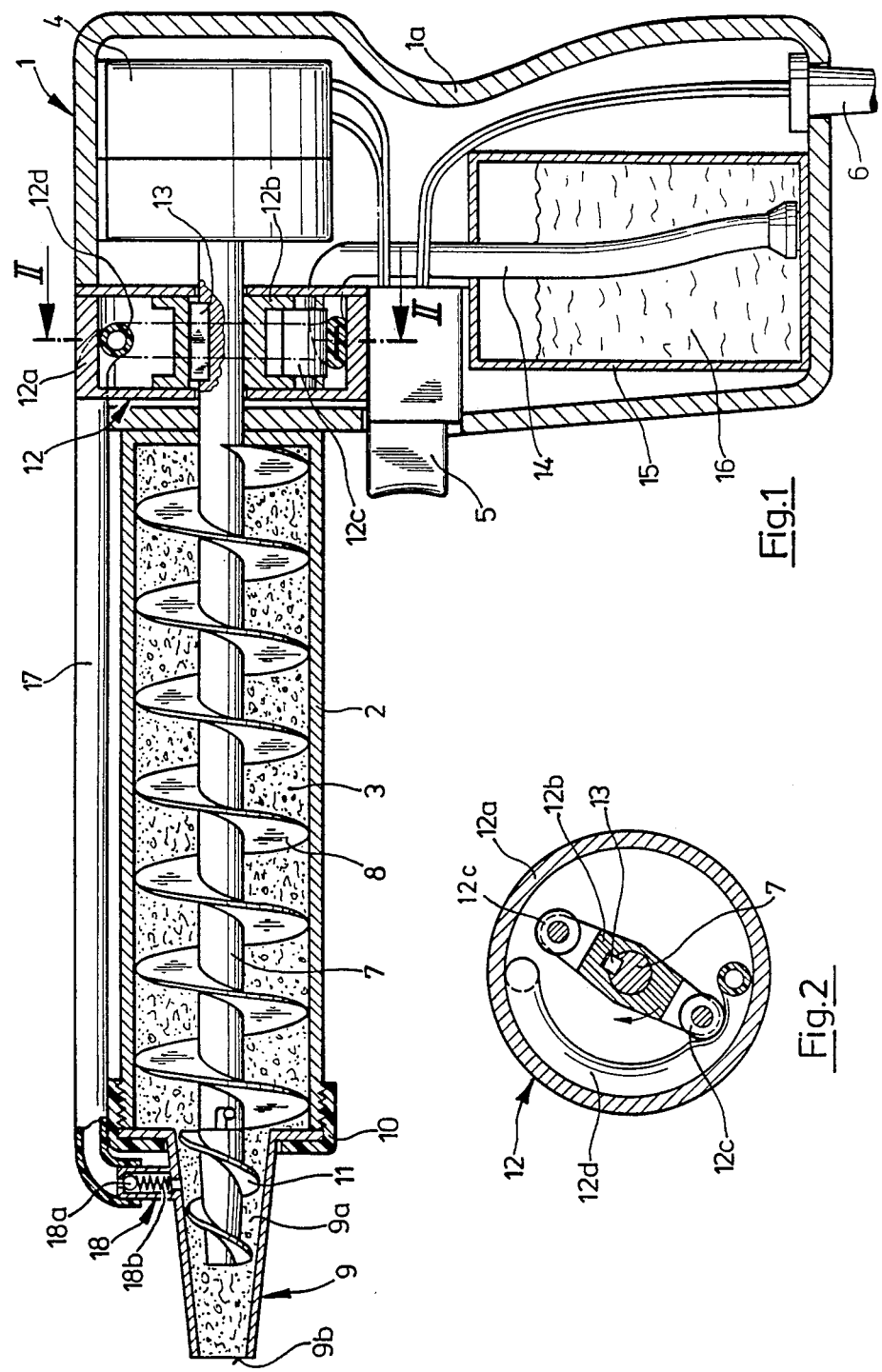

HAND TOOL FOR MIXING AND DISPENSING TWO-COMPONENT MASSES

BACKGROUND OF THE INVENTION

The present invention is directed to a hand tool for the mixing and metered dispensing of a two-component mass and includes a drive shaft rotationally driven by an actuating device, a conveying helix is provided on the drive shaft and a mixing worm is connected to one end of the drive shaft and is located within a mixing chamber for mixing the components.

At the present time, two component masses are frequently mixed with one another in a cumbersome manner within an open container for subsequent use. With variable use requirements, quite often too much or too little of the mass is available. Since the mass in the mixed condition must be used within a specific time period, if an excess quantity is mixed, it is lost as waste.

In the German Offenlegungsschraft No. 28 09 228 a hand tool for mixing a two-component mass is disclosed with one of the components being microencapsulated. The device includes a conveying helix which compresses and breaks the microcapsules by one or more perforated members. A second component may be microencapsulated or fed to the device through a hose or tube. Since microencapsulation is a very expensive type of component storage, at the present time it has not experienced great use.

In this known device, depending on the arrangement of the components, great variations in the mixing ratio can occur, if one component is fed separately from the other so that a resultant disadvantageous effect upon the quality of the two component mass occurs.

SUMMARY OF THE INVENTION

It is the primary object of the present invention to provide a hand tool for the mixing and metered dispensing of a two-component mass which maintains the mixing ratio constant independent of the amount of the dispensed mass.

In accordance with the present invention, a metering pump supplies one of the components and is driven by a drive shaft which also supplies the other component to a common mixing chamber. A connecting line interconnects the metering pump and the mixing chamber.

The metering pump for supplying a liquid component is coupled with the device for supplying the solid component. Accordingly, an appropriate amount of the liquid component is supplied independently of the amount of the mass dispensed. Since the metering pump is connected to the mixing chamber by the connecting line, the liquid component is supplied into the solid component at a location just preceding a dispensing nozzle opening from the mixing chamber. If there is an extended interruption in the use of the tool, it is only necessary to waste that portion of the mass located within the mixing chamber.

To provide a compact construction of the hand tool, the metering pump is arranged on the drive shaft within the tool. As a result, the rpm of the metering pump along with the conveying helix and the mixing worm are always automatically the same.

Different types of pumps can be used as the metering pump, such as gear pumps or the like. For accurate metering, a hose pump is advantageously used as the metering pump. In a hose pump, the liquid component being conveyed is squeezed through a deformable hose or tube by rollers. The output volume from the pump is exactly proportional to the rpm or to the angle of rotation of the metering pump.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawings:

FIG. 1 is an elevational view, mostly in section, of a hand tool embodying the present invention; and FIG. 2 is a sectional view through the tool taken along line II—II in FIG. 1.

DETAILED DESCRIPTION OF THE INVENTION

In FIG. 1 a hand tool in the shape of a hand gun is illustrated and includes a housing 1 with a downwardly extending handle 1a. An axially extending cylindrically shaped container 2 is mounted in the housing 1. The container 2 extends in the form of a barrel from above the handle to the front or dispensing end of the hand tool. The container holds a solid component of a two-component mass. A motor 4 is positioned within the housing 1 above the handle 1a. Motor 4 is connected with an electric power supply line 6 through a trigger-like switch 5 in the handle so that the motor can be turned on and off by the switch 5. A drive shaft 7 is connected to and driven by the motor 4 and extends from the motor toward the front end of the housing passing through the container 2. The shaft 7 is coaxial with the container 2 and a conveying helix 8 is secured to the drive shaft extending from the rear end to the front end of the container. The conveying helix 8 carries the solid component 3 within the container 2 toward the front end of the container. A conically shaped dispensing nozzle 9 is detachably connected to the front end of the container 2 by a union nut 10. The interior of the dispensing nozzle 9 forms a mixing chamber 9a in communication with the front end of the container 2. A mixing worm 11 is connected to the front end of the drive shaft 7 and is located within the mixing chamber. When the motor 4 is turned on, the portion of the two-component mass located within the mixing chamber is simultaneously mixed and conveyed in the direction of a dispensing aperture 9b at the front end of the dispensing nozzle 9.

Within the housing 1 at the rear end of the container 2, a metering pump 12 is positioned. Metering pump 12 is a hose pump and has a can-shaped or cylindrically shaped pump housing 12a. In pump housing 12a an axially extending support 12b encircles the drive shaft and is secured to it by a key 13 so that the support rotates with the shaft. As can be seen in FIG. 2, the support 12b extends diametrically outwardly relative to the drive shaft 7 and a roller 12c is located on each of the radially outer ends of the support, accordingly, the rollers are located diametrically opposite one another. A flexible hose or tube 12d is located around one-half of the inside of the pump housing 12a and as the drive shaft 7 rotates the rollers 12c alternately press against the hose 12d and squeeze its contents out of the metering pump 12. At one end, the hose 12d is connected with a suction line 14 extending downwardly from the pump housing 12a into a tank 15 located within the handle 1a. Tank 15 holds a liquid component 16 of the two-component mass. At its opposite end within the metering pump, the hose 12d is connected to a connecting line 17. Connecting line 17 extends generally parallel with the axis of the container 2 from the pump housing 12a to the dispensing nozzle 9. A check valve 18 connects the front end of the connecting line 17 with the mixing chamber 9a. Check valve 18 prevents any return flow of the liquid component by means of a valve member 18a spring-biased by a spring 18b so that the liquid component can flow into the mixing chamber but can not flow back into the connecting line 17.

A specific mixing ratio is always accurately maintained independent of the amount of the mass dispensed because of the connection of the metering pump 12 and the conveying helix 8 with the drive shaft 7. This arrangement assures a uniform quality of the mass being dispensed. In the event the tool is not used for a prolonged period of time, only the portion of the two components of the mass within the mixing chamber 9a need to be removed. Such removal can be effected in a simple manner by detaching the dispensing nozzle 9 by unscrewing the union nut 10.

The cross-section through the metering pump 12 set forth in FIG. 2 illustrates a rotationally symmetrical pump housing 12a with the support 12b secured to the drive shaft 7 by the key 13 so that the support rotates with the shaft. At each of the radially outer ends of the support, rollers 12c are mounted and press the hose 12d against the inside surface of the pump housing 12a moving the liquid component through the hose, due to the rolling motion of the rollers, into the connecting line 17. As a result, the amount of liquid component 16 conveyed by the metering pump 12 depends directly upon the rpm of the metering pump. The construction of the metering pump is very simple and not prone to malfunction. Furthermore, the liquid component 16 can, under certain circumstances, contain additives.

While specific embodiments of the invention have been shown and described in detail to illustrate the application of the inventive principles, it will be understood that the invention may be embodied otherwise without departing from such principles.

We claim:

1. Hand tool for mixing and metered dispensing of a two-component mass comprising a support member (1), an axially elongated container (2) having a first end and a second end spaced apart in the axial direction and mounted in said support member and arranged to hold a first component of the two-component mass, an axially elongated drive shaft (7) extending through said container in the axial direction thereof, means for rotating said drive shaft, a mixing chamber (9a) mounted on the first end of and in coaxial relation with said container, a conveying helix (8) on said drive shaft within said container, a mixing worm (11) located within said mixing chamber and connected to said drive shaft for rotation therewith, a metering pump (12) mounted in said support member adjacent the second end of said container and powered by said drive shaft, a connecting line (17) interconnecting said metering pump and said mixing chamber and means for a second component to be delivered to said metering pump.

2. Hand tool, as set forth in claim 1, wherein said metering pump (12) is secured on said drive shaft and is driven by said drive shaft simultaneous with the rotation of said conveying helix by said drive shaft.

3. Hand tool, as set forth in claim 1, wherein said metering pump (12) is a hose pump.

4. Hand tool, as set forth in claim 1, wherein said support member and said container combine to form a hand gun-shaped said tool with said support member (1) forming a housing containing said motor (4) with a handle (1a) extending from said housing, means within said handle for operating said motor, and said handle being hollow and a tank (15) located within said handle for holding a liquid component of the two-component mass, and means (14) for supplying the liquid component from said tank to said metering pump (12).

5. Hand tool, as set forth in claim 1, wherein said metering pump comprises a cylindrically shaped housing (12a) with a central axis coaxial with said drive shaft, said metering pump located adjacent the second end of said container and between said container and said motor, a hose (12d) located within said pump housing and extending around approximately one-half of the inside circumference of said pump housing, a support (12b) secured to said drive shaft for rotation therewith within said pump housing, rollers (12c) mounted on said support on diametrically opposite sides of said drive shaft and positioned for contacting said hose and alternately squeezing said hose as said support member is rotated by said shaft.

6. Hand tool, as set forth in claim 5, wherein said hose within said pump housing has an inlet end and an outlet end, a suction line (14) connected to said inlet end and extending into a tank containing the second component of the two-component mass, and a connecting line (17) connected to said outlet end and extending axially therefrom parallel with said drive shaft to said mixing chamber.

7. Hand tool, as set forth in claim 6, wherein a check valve (18) connects said connecting line to said mixing chamber for preventing flow back through said connecting line to said metering pump.

8. Hand tool, as set forth in claim 7, wherein a union nut (10) connects said mixing chamber to the first end of said container so that by removing said union nut said mixing chamber can be removed from said container for removing any mixed two-component mass from said mixing chamber.

* * * * *